US011621560B2

(12) United States Patent
Vestesen (10) Patent No.: US 11,621,560 B2
(45) Date of Patent: Apr. 4, 2023

(54) GRID FORMING POWER SUPPLY PLANT AND METHOD

(71) Applicant: Danvest Energy A/S, Hellerup (DK)

(72) Inventor: Søren Qvist Vestesen, Hellerup (DK)

(73) Assignee: Danvest Energy A/S

( * ) Notice: Subject to any disclaimer, the term of this patent is extended or adjusted under 35 U.S.C. 154(b) by 0 days.

(21) Appl. No.: 16/982,804

(22) PCT Filed: Mar. 20, 2019

(86) PCT No.: PCT/EP2019/056989
§ 371 (c)(1),
(2) Date: Sep. 21, 2020

(87) PCT Pub. No.: WO2019/180096
PCT Pub. Date: Sep. 26, 2019

(65) Prior Publication Data
US 2021/0006072 A1      Jan. 7, 2021

(30) Foreign Application Priority Data

Mar. 20, 2018  (NL) ...................................... 2020629

(51) Int. Cl.
*H02J 3/32* (2006.01)
*H02J 3/38* (2006.01)

(52) U.S. Cl.
CPC ................ *H02J 3/32* (2013.01); *H02J 3/381* (2013.01); *H02J 2300/20* (2020.01)

(58) Field of Classification Search
CPC ........... H02J 3/32; H02J 3/381; H02J 2300/20
(Continued)

(56) References Cited

U.S. PATENT DOCUMENTS

| 4,637,306 A | 1/1987 | Bricaud et al. |
| 8,423,199 B2 | 4/2013 | Kalen |

(Continued)

FOREIGN PATENT DOCUMENTS

| EP | 0165847 A1 | 12/1985 |
| EP | 2083170 A1 | 7/2009 |

(Continued)

*Primary Examiner* — Hal Kaplan
(74) *Attorney, Agent, or Firm* — The Webb Law Firm (57) ABSTRACT

The present invention relates to a method and plant of operating a grid forming power supply plant based on both a renewable energy, such as based on wind energy, solar energy, hydro energy, wave energy, and a carbon based energy, such as carbon based fuel. The grid includes a power input connection from a renewable power supply system and a power input connection from an carbon fuel engine based generator set. The generator set includes an engine for converting the carbon-based energy into motion energy, a generator, such as an alternator, for converting the motion energy into electrical energy, and a clutch for coupling and uncoupling of the engine with the generator. The system also includes a power buffer, such as a battery, subsystem for providing short term grid forming capacity and a plant grid forming controller for controlling grid parameters by means of controlling steps of a method. The plant grid forming controller includes interaction means for interacting with a control unit of the renewable power supply system, interaction means for interacting with a power buffer control unit, and interaction means for interaction with a control unit of the generator set.

25 Claims, 3 Drawing Sheets

(58) Field of Classification Search
USPC .......................................................... 307/38
See application file for complete search history.

(56) References Cited

U.S. PATENT DOCUMENTS

2015/0322874 A1\* 11/2015 Scuderi ................... F02D 29/06
                                                                                                700/287
2017/0168516 A1     6/2017   King

FOREIGN PATENT DOCUMENTS

GB         2540251 A    11/2016
WO      2018033432 A1    2/2018

\* cited by examiner

GRID FORMING POWER SUPPLY PLANT AND METHOD

CROSS-REFERENCE TO RELATED APPLICATIONS

This application is the United States national phase of International Application No. PCT/EP2019/056989 filed Mar. 20, 2019, and claims priority to The Netherlands Patent Application No. 2020629 filed Mar. 20, 2018, the disclosures of which are hereby incorporated by reference in their entirety.

BACKGROUND OF THE INVENTION

Field of the Invention

The present invention relates to a method for operating a grid forming power supply plant based on both a renewable energy, such as based on wind energy, solar energy, hydro energy, wave energy, and a carbon based energy, such as carbon based fuel. Furthermore, the present invention relates to a plant for operating a grid forming power supply plant based on both a renewable energy, such as based on wind energy, solar energy, hydro energy, wave energy, and a carbon based energy, such as carbon based fuel.

Description of Related Art

It is known to provide grid forming power plants for providing power to a grid, such as an island grid. Such plants originally operated on fossil fuels such as diesel. Previously, it has been conceived to combine the grid forming capacity of such a generator set with added power from a renewable energy source, such as wind energy. An advantage thereof is that carbon emissions are reduced during availability of such renewable energy source.

However, next to such advantages, it is the object of the present inventor to improve a relation between fossil fuel usage and degree of stability of the grid, such as determined by grid parameters such as a voltage and frequency. Instances of sudden demand increases or decreases, as well as instances of variations of renewable power availability leads to instabilities in parameters of the grid.

SUMMARY OF THE INVENTION

In order to provide such an improvement, the present invention therefore provides a method for operating a grid forming power supply plant based on both a renewable energy, such as based on wind energy, solar energy, hydro energy, wave energy, and a carbon based energy, such as carbon based fuel, the grid forming power supply system comprising:
  a power input connection from a renewable power supply system,
  a power input connection from a carbon fuel engine based generator set, the generator set comprising:
    the engine for converting the carbon-based energy into motion energy,
    a generator, such as an alternator, for converting the motion energy into electrical energy,
    and a clutch for coupling and uncoupling of the engine with the generator,
  a power buffer, such as comprising a battery, subsystem for providing short term grid forming capacity,
  a plant grid forming controller for controlling grid parameters by means of controlling steps of the method,
  the method comprising steps of:
    controlling the grid parameters to remain within predetermined limits based on availability of power from the renewable power supply system, the generator set and the battery,
    uncoupling of the engine with the clutch in case of sufficient power capability by the renewable power supply system,
    power driving the generator such that it rotates and functions as an electromotor by providing it with electrical energy during at least part of the time the generator is uncoupled from the engine.

Important advantage is provided by the combination of the power buffer with the capability that the generator remains connected to the grid when and clutched from the engine. This achieves that both the positive effect of the generator relative to the grid due to its reactive power related properties and the power delivery capabilities of the power buffer, preferably with an grid forming inverter incorporated in the power buffer, further preferably with an incorporated battery.

An advantage of a plant according to the present invention is that because the generator is arrangeable to remain coupled to the grid while being decoupled from the engine, the generator is arrangeable to function as a power buffer relative to variations in the grid in that state of being decoupled from the engine and coupled to the grid. Thereby, unusable power components, such as a reactive load, may still be produced by the generator as it is connected to the grid, thereby providing assistance to the grid forming capacity of the plant.

Also, as the generator is kept connected to the grid, the generator is controllable to take up energy from the grid or the renewable energy supply system, and thereby controllable to absorb peaks in power supplied or peaks in power created in the grid due to sudden demand changes, such as decreases and increases. Controlling this is preferably performed by controlling the amount of power supplied to the generator while functioning as an electromotor.

Furthermore, because the generator is kept into rotation based on energy from the renewable energy supply system, which is then excess energy not required by the grid, a rise in demand of the grid may be provided to the grid by momentarily lowering the power towards in the generator. As such, the generator is used as a buffer for power. This energy does not need to be provided by the power buffer, such as comprising a battery, therefore lowering the strain on such power buffer. It is emphasized that such resulting relatively low strain on a battery has a high effect on the durability and life expectancy of such a power buffer. A lower strain means that lower temperature variations occur, and that depletion of the alternative power source is prevented more often. In case of such battery based embodiments of the power buffer, as further detailed below, a battery life expectancy of five to six years instead of one to two years is expected to be advantageously achievable with the present invention and/or preferred embodiments.

Furthermore, due to provided controlling of the generator into rotation, a startup procedure of the engine of the carbon fuel based engine based generator set is be performed while using the motion energy of the generator as being in motion to overcome part of the inertia of the engine as well as not requiring to overcome the inertia of the generator at the time of starting up the engine. This provides very quick startup time of the combination generator and engine. As power becomes available from the generator set in this quick fashion according to preferred embodiments of the present invention, a discharge load or strain on the, preferably battery based, power buffer is effected to be significantly shorter or significantly smaller or a combination thereof then would have been possible without such power driving of the generator into rotation. A quick starting up of the engine according to preferred embodiments provides the advantage of limited thing the risks of fails during attempts to synchronize the generator with the grid. Also variable losses of time during synchronization are limited or eliminated. The electrical grid parameters are as such controlled to improve stabilization thereof and increasing power quality levels.

Further preferably, steps are provided to start rotation of the generator at moments that are determined to be moments that either an increase in greater demand, or a decrease in power supply from the renewable power supply system, or a combination thereof, is expected within a predetermined time frame. This provides the advantage that provisional startups of the carbon fuel engine that would be required for providing predetermined grid parameter quality, can be omitted while maintaining grid quality by being able to start up the engine while using motion energy of the generator before, at the time of, or after coupling of the engine with the generator by means of the clutch. So not only the strain on the power buffer is lowered, but also the strain on the engine due to preventing precautionary startups, is lowered as well as accompanying fuel usage.

A further advantage of the present invention is that both the charging loads and the and charging loads, such as charging peak loads and in charging peak loads are subsequently lowered relative to the prior art.

According to a first preferred embodiment, the method according to the present invention the steps of power driving the generator comprise steps of power driving the generator for providing motion energy to the engine during coupling of the engine with the generator. A preferable effect thereof is that the strain on the power buffer due to slow engine startups is limited and/or and that fuel consumption by the engine is lowered because of later and/or less startups.

Further preferably, the steps of power driving the generator comprise steps of providing electrical energy originating from the renewable power supply system towards the generator. As indicated, this provides the advantage of keeping the generator in motion on excess energy from the renewable power supply system while for this purpose and no fossil fuel or carbon based fuel is used. Also as indicated, this provides a lower strain on the power buffer.

According to a further preferred embodiment, the generator is controlled to buffer energy, due to variations originating in the grid, from the grid. This is advantageous as, in an island grid towards which the invention is oftentimes directed, it is quite common to have heavy equipment that have occurrences of producing relatively high levels of reactive power.

According to a further preferred embodiment, the method comprises steps of:
monitoring at least one predetermined battery parameter of the power buffer when comprising a battery, such as charge level, and/or
controlling at least one parameter such that or with the aim of keeping the at least one predetermined battery parameter within certain ranges, such as certain ranges between a minimum and maximum value thereof of the battery capabilities. This preferred embodiment provides advantages specifically directed at limiting strain on a battery as comprised in a power buffer by the actual monitoring of the at least one predetermined battery parameter. Parameters to be comprised in the at least one predetermined battery parameter comprise level of charge, rate of discharge speed, rate of charge speed, wherein the level of charge is preferably maintained between 40 and 60% of maximum charge level in order to be able to switch between charging and discharging depending on parameters of the grid, generator with coupled engine or with uncoupled engine, and or parameters of the renewable power supply system. An advantage of such controlling of the at least one parameter is that with a relatively small battery grid power quality can be maintained while variations occur within the grid, renewable energy supply system and while being able to maintain the engine in a stopped state as much as possible or to limit the number of starts of the engine or precautionary starts of the engine that would be required without such feature.

According to a further preferred embodiment, the steps of controlling of the grid parameters comprise steps of limiting the rate of discharge of the batteries, preferably by respective raising or lowering of the amount of power supplied to the generator. The inventor has recognized a buffering capability of the generator by both lowering the amount of power provided to the generator and increasing the amount of power provided to the generator as well as using a reactive power capability of the generator, preferably while connected to the grid. As such, this buffering capability of the generator is applied within the scope of the present invention and/or embodiments thereof to prevent high levels of strain on the battery both charging and discharging. In order to use this buffering capability towards raising the amount of power supplied to the generator, steps of controlling comprise steps of keeping the power towards the generator below a certain maximum threshold that is below a predefined maximum uptake capacity of the generator. In order to use this buffering capability towards lowering the amount of power supplied to the generator, steps of controlling comprise steps of keeping the power towards the generator above a certain minimum threshold that is above 0 or above a minimal predetermined level, such as a minimal predetermined level to keep the generator into rotation.

According to a further preferred embodiment, the method comprises steps of controlling the generator to absorb and/or produce reactive power, preferably contributing to the controlling of the grid parameters, also while the generator is uncoupled from the engine. An advantage thereof is that effects of the grid can be alleviated by keeping the generator couples to the grid in a rotary fashion. Preferably, the amount of electrical power directed to the generator is a parameter of such control.

Further preferably, steps of controlling the power buffer to charge on power from the renewable power supply system that is in excess of power from the renewable power supply system momentarily required for controlling the grid parameters are provided to favorably charge the battery and a carbon emission free manner.

In case of for instance relatively abrupt lowering of the amount of power available from the renewable power supply system, I preferred embodiment provides controlling steps for controlling the grid parameters comprising steps of controlling the power buffer to discharge power in order to maintain the grid parameters within the predetermined limits. As such, advantageously uncontrollable variations in the availability of renewable energy from the renewable power supply system can be buffered by the power buffer in order to prevent a requirement to start up the engine, either in reaction to a shortage or as a predetermined preemptive start up.

During such state of providing power towards the grid from the power buffer in order to maintain the grid parameters the method preferably comprises steps of having a power buffer control controlling the grid parameters during a situation of power loss from the renewable power supply system and/or a time period of starting up the engine or coupling the energy with the generator by the clutch. This advantageously allows to optimize the functioning of the power buffer towards maintaining the parameters of the grid within predetermined limits. All according to one or more of the preceding claims comprising steps of controlling the power buffer by preventing reactive power influences to and from the power buffer.

According to a further preferred embodiment, the power buffer is controlled to only providing active power in controlling grid parameters, preferably in combination with the generator controlled to be handling reactive power demands from the grid. An advantage thereof is that a reactive strain on the power buffer is limited.

Further preferred steps according to the present invention provides steps of monitoring a temperature level of batteries of the power buffer and controlling the use of the batteries of the power buffer to remain within predetermined temperature parameters. Such embodiment is preferred in light of the advantage that limiting excess temperatures of batteries highly curtails the degenerative effect of such high temperatures to the batteries. Further preferably steps according to the present invention provides steps of monitoring a battery current level of batteries of the power buffer and controlling the use of the batteries of the power buffer to remain within predetermined battery current levels. Such embodiment is preferred in light of the advantage that limiting the current in a battery highly curtails the degenerative effect of such high temperatures to the batteries.

According to a further preferred embodiment, the method comprises steps to keep a battery level in a predetermined buffer range, such as between 40 and 60%. Other preferred ranges considered are between 30 and 70%, between 30 and 50%, between 50 and 70%, between 20 and 80%. In case of e.g. variable winds, in which relatively more when the drops and then certain when prices are expected, it may be preferable to start the foreseen period of such went parameters with a relatively high charge of 8% in order to allow the power buffer to buffer more of such sudden drops in that time.

According to a further preferred embodiment, the method comprises steps of increasing power from the renewable power supply system towards the grid in case battery parameters indicate battery operation above predetermined limits. This is for instance achieved by limiting the amount of power towards the rotating generator as a manner of controlling variations in grid parameters. This is possible as the generator is kept into rotation by excess power from the renewable power supply system.

According to a further preferred embodiment, the method comprises steps of decreasing power from the renewable power supply system in case battery parameters indicate battery operation below predetermined limits. In case for instance the battery charge rises above an upper limit, the renewable power supply system is controlled to limit its output, such as used for charging the battery. An advantage thereof is that the battery will be able to absorb excess energy in the system as a whole, thereby adjusting temporary rising grid parameters values by charging the battery.

Further preferably, the method comprises steps of keeping track of expected power availability from the renewable power supply system for a pre-determined period of time to come. This provides the advantage of, 40 predetermined time period, pre-dieting of grid power requirements variations in relation to the available amount of renewable power and or battery power. Therefore, battery-powered can be preemptively raised or lowered to meet demands caused by variations in renewable power availability as predicted. This provides the ability to prevent either preemptive engine starts or to prevent engine starts for providing power for moments that battery reserves would be too limited to cover the demands to maintain grid parameters during such variations.

A further aspect according to the present invention provides a plant for operating a grid forming power supply plant based on both a renewable energy, such as based on wind energy, solar energy, hydro energy, wave energy, and a carbon based energy, such as carbon based fuel, the grid forming power supply system comprising:
- a power input connection from an renewable power supply system,
- a power input connection from an carbon fuel engine based generator set, the generator set comprising:
  - the engine for converting the carbon-based energy into motion energy,
  - a generator, such as an alternator, for converting the motion energy into electrical energy,
  - and a clutch for coupling and uncoupling of the engine with the generator,
- a power buffer, such as comprising a battery, subsystem for providing short term grid forming capacity,
- a plant grid forming controller for controlling grid parameters by means of controlling steps of a method according to one or more of the preceding claims, the plant grid forming controller comprising:
- interaction means for interacting with a control unit of the renewable power supply system,
- interaction means for interacting with a power buffer control unit,
- interaction means for interaction with a control unit of the generator set.

Advantages of this aspect of the present invention have been described in the above in relation to the above aspect of the present invention. Further details of the present aspects will be set out below in relation to the attached drawings.

According to a preferred embodiment, a plant according to the present aspect of the invention comprises a grid tied inverter in relation to the renewable power supply system when the renewable energy is solar energy and in which the plant comprises a grid forming inverter in relation to the renewable power supply system when the renewable energy is wind energy.

According to a further preferred embodiment, the clutch comprises a magnetic clutch arrangement in case the engine is a high-speed engine and in which the clutch comprises a standard clutch arrangement, such as with a clutch disc of pressure plate, in case the engine is a medium speed engine. In further preferred embodiments, engine is a high-speed diesel engine, a medium speed diesel engine, a gas engine or a hydrogen engine.

Further preferably, the plant comprises a dumpload system for absorbing electrical energy in case of an electrical energy surplus, either caused in the grid or cost in the renewable power supply system or carbon fuel engine based generator set. Such dumpload system is preferably comprising resistors for converting electrical energy into heat. Such dumpload system is capable of absorbing electrical energy even faster than batteries in case of very sudden variances in the energy supply, preferably the renewable energy supply. In case of a sudden surge in for example solar energy or wind energy, such a dumpload system is arranged to very quickly absorb the surplus energy. In case such a dumpload system is kept absorbing electrical energy for a duration of time, switching down, or off, of the dumpload system provides very quick way of raising the energy supply towards the grid. Such control strategy is usable in case of a renewable energy surplus for at least part of said duration of time.

According to a further preferred embodiment, the plant comprises a generator set that is arranged to operate in low load operation states in which the engine operates below 30% of nominal capacity up to −10% of nominal capacity.

BRIEF DESCRIPTION OF THE DRAWINGS

Further advantages, features and details of the present invention will be further elucidated on the basis of a description of one or more embodiments with reference to the accompanying figures.

DESCRIPTION OF THE INVENTION

Figure 1:
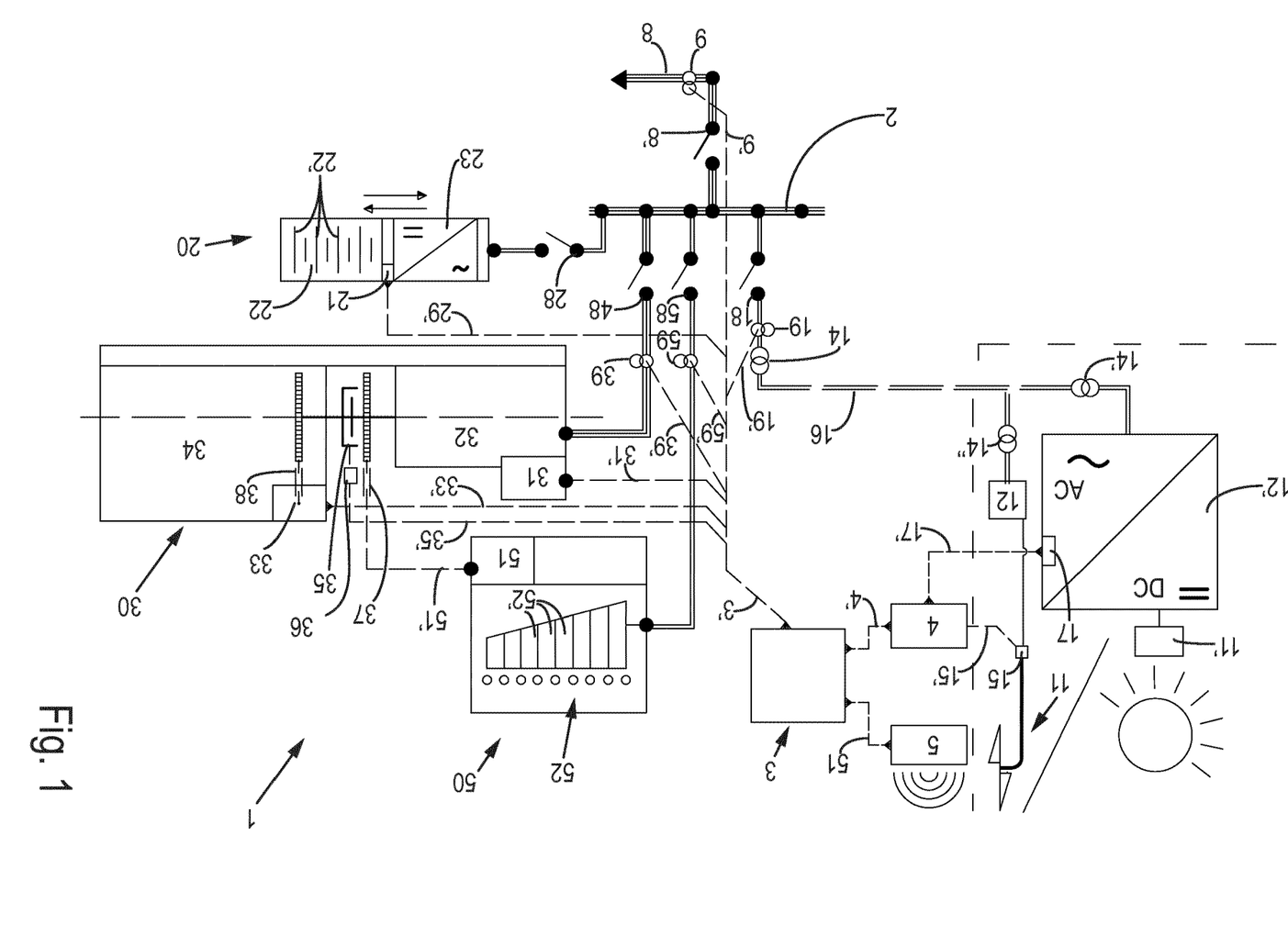
FIG. 1. is an embodiment of a grid forming power supply plant according to the present invention.

FIG. 1 relates to a first preferred embodiment of a plant 1 according to the present invention, comprising both required parts and optional parts, the required parts only being limited to parts as identified in the respective dependent and independent claims. A busbar 2 is provided to link the plant with a power grid, preferably an island grid that is preferably solely provided with electrical power from this power plant.

The plant 1 comprises a plant controller 3, a, preferably battery based, power buffer subsystem 20, generator set subsystem 30, as well as an optional dumpload system 50. The plant controller is provided with an interface controller 4 for controlling a power supply towards the busbar from a renewable power supply system comprising either a wind turbine 11 or a solar energy collector 11'. The interface controller is intended to be the outer limit of the power plant, being arranged to cooperate with controlling the devices of the renewable energy supply system, such as wind turbine controller 15, via control line 15', and solar controller 17, via control line 17'. The busbar 2 is connected to the grid line 8 via a switch 8'. Inrush currents from starting up off electrical drives in the grid are alleviated by the rotating alternator connected to the busbar. With embodiments of the present invention, the electrical grid is run in a stable manner and power quality is kept at a high level as opposed to the prior art. Shorts circuitry currents are taken up during grid faults. A Scada system 5 is used for monitoring and storing of operational data relating to the renewable energy sources and used as an input for creating control signals by the plant controller 3.

Outside the plant according to the direct scope of the present invention, but herein added for clarity, the wind turbine 11 is provided with a controlling device 12 for controlling the power parameters of the energy provided by the wind turbine 11 towards the power line 16 connected with the busbar 2 via a transformer 14, a multi-function measuring device 19 and a switch 18. Similarly, the solar collector 11' is connected with the power line 16 by means of a DC/AC converter 12', preferably also comprising solar controller 17 in communication, via control line 17', with the interface controller of the plant 1. Optionally, outgoing transformers are used with respect to the wind generator and the solar collector towards power line 16 in case design parameters, such as the length of the power line 16, so indicate in line with the understanding of the skilled person.

The power buffer subsystem 20 comprises of the combination of an energy store for storing electrical energy, such as a battery 22 consisting of battery cells 22'. A power buffer subsystem controller 21 is provided to control the power buffer subsystem from the plant controller 3 as well as to provide autonomous functions to the power buffer subsystem 20. The power buffer subsystem 20 also comprises an inverter 23 that is preferably a grid forming inverter able to control grid parameters, also if the power buffer subsystem is the only subsystem providing power to the grid via the busbar. The extent to which the power buffer subsystem solely controls the grid parameters and provides power to the grid, is determined by the plant controller 3.

Preferably, the grid forming inverter 23 is arranged to control the grid parameters as long as the grid forming inverter 23 is coupled to the busbar by means of switch 28. An advantage of such an arrangement is that the power buffer subsystem 20 is constantly on standby to provide power in case of variations in supplied power towards the grid, mostly caused by variations in winter or sunlight, or variations in consumed energy in the grid, mostly caused by switching on or switching off of large consumers in the grid. Especially advantageous in this is the cooperation or co-functioning of both the power buffer subsystem with its grid forming inverter and the generator set, both with the alternator alone and the alternator clutched in which the engine. The specific advantage of this combination is that the alternator constantly provides its reactive energy producing capability along with the power buffer battery capacity. This means that the strain on the batteries, both charging and discharging, as indicated elsewhere in this description, is advantageously kept low with respect to this capability of the alternator when co-connected, via switch 48, with the power buffer to the busbar.

Furthermore, this means that a relatively small battery can be used, preferably so arranged that, besides maintenance cycles of fully charging and discharging batteries, the batteries are kept at levels such that sufficient capacity to charge and discharge depending on variations in the grid exists, as also indicated in other passages of this description. Furthermore, by lowering the strain on the batteries, such as by lowering the number of situations in which a quick charge or discharge occurs, situations in which the temperatures of the batteries rise out of necessity occur less frequently or are prevented.

Keeping occurrences of high temperatures in the batteries low by keeping strain low is also achieved by the arrangement of providing the possibility of quick or almost instant engine startups because the alternator is kept in rotation and situations wherein the engine is fully stopped. Although keeping the alternator in rotation costs electrical energy, this electrical energy is taken from a surplus of renewable energy beyond the momentary demand by the grid. These advantages are to be seen in combination with lowered carbon fuel usage due to the capability of the engine to be kept in the off state due to the buffering capacity of the rotating alternator because less provisional engine starts have to be performed, such as also disclosed in the above in this description. A similar use of renewable energy exists when the engine is running below 30% of nominal capacity, as disclosed below, which provides the advantage of the engine remaining in a mere immediate power-up state preferably at the expense of a small amount of excess renewable energy.

The generator set subsystem 30 as included in this preferred embodiment according to the present invention generally comprises a generator embodied as an alternator 32 and an engine 34, which alternator 32 and engine 34 are connected by means of a drive shaft comprising a clutch 35 for coupling and decoupling of the alternator relative to the engine. The drive shaft is provided for both driving of the alternator by the engine and driving the engine by the alternator, either based on kinetic energy present in the alternator or by the alternator being driven by electrical energy driving the alternator into motion.

The engine is adapted to run in several modes, comprising a normal mode, in which the engine is operated on carbon based fuel, preferably fossil fuel further preferably diesel fuel, in which in normal mode the engine runs on 30% to a 100% of nominal engine capacity. In this range, a regular diesel engine is able to regularly function under load providing motion energy towards the consumer, in this case the alternator.

The engine of the embodiment is adapted to also function in a low load mode. This low load mode is a mode in which the engine load achieved based on fuel supply is between 0 and 30%. An advantage of this mode is that the engine uses a relative lead low amount of fuel while still running and being capable of powering up to mode one very quickly based on this state, such as by means of increasing fuel supply towards the engine.

A further mode for operating the engine is reverse mode in which no fuel or almost no fuel is provided towards the engine and the engine is kept in motion by the alternator, the alternator being provided with electrical energy to function as a motor. Also in this mode, the engine is capable of being powered up towards normal mode as the engine is kept into motion as well as the alternator. Because of this kinetic energy, a powering up of the engine may be performed without having to overcome the inertia of an engine and or alternator at standstill.

A further mode for operating the engine is in a stopped mode. In stopped mode, the engine is preferably clutched out from the alternator and allowed to come to a standstill. A restart of the engine from this mode takes more time than a powering up of the engine from the other modes. Therefore, in a situation in which the controllers are expecting grid power demand requiring input from the engine, a startup of the engine has to be timed ahead-ahead of such demand in order to enable a full startup.

An advantage of the situation that the alternator is clutched out from the engine is that the alternator is arrangeable to be both in a rotary state and coupled to the busbar. This is advantageous as it provides the capability of using the alternator to provide electrical and mechanical inertia to handle variations in grid parameters during startup of electrical devices in the grid. In other words, the alternator assists in absorbing an inrush current finding its origin in electrical devices connected to the grid, such as from large motors during startup thereof. In other words, the alternator continues to produce reactive power while connected to the busbar and disconnected from the engine. These effects have a positive lowering effect on the achieved maximum strain on the batteries. A further positive advantage of the alternator being kept connected to the busbar is that it absorbs unintended power peaks, such as from the grid or renewable energy source.

A further subsystem, albeit optional, as present in the preferred embodiment is the dumpload system 50 which is connected to the busbar via switch 58. The dumpload system provides a very fast absorbing capacity of excess electrical power, substantially provided by the power absorption assembly 52 comprising a number of resistors 52', preferably air cooled or water cooled or a combination thereof. The resistors are arranged to directly absorb electrical energy and convert it to heat.

From the plant controller 3, communication lines or control lines lead to subsystems and metering devices in order to convey control signals and measuring signals between the plant controller 3 and the subsystems and metering devices. The main control line 3' exits the plant controller 3 and is branched off toward control lines for the subsystems and metering devices.

For convenience of the description, the control lines are described separately from the steps in which the control lines are used in. A control line 33' is used to control, via device 33, the functioning of the engine and to feedback data, via device 33, towards the plant controller. Part of this data is data collected by measuring device 38 providing information relating to fuel usage, frequency, KWM operation levels, whether the engine is clutched in with the alternator, and in the engine is running or stopped. A control line 35' is connecting the plant controller 3 with the clutch controller 36. A control line 31' is connecting the plant controller with the alternator controller 31. A dumpload controller 51 receives, via control line 51', information from measuring device 37 measuring alternator parameters, such as rotations per minute.

A control line 29' next to plant controller with the power buffer controller 21 in order to monitor the status of the batteries and provide controls towards the grid forming inverter of the power buffer.

Several multi-instrument measuring devices are connected to the plant controller. These multi-instrument measuring devices are arranged to provide information relating to kilowatts, kWe Balance, voltage, reactive power in KVAr or KVAr balance, frequency or variations thereof relative to a predetermined frequency such as 50 Hz, and a relation between the real power and apparent power in Cos phi. Respective multi-instrument measuring devices comprise device 9 connected with the plant controller 3 via control 9', device 19 connected to the plant controller via a control line 19', device 59 connected with the plant controller via control line 59', and device 39 connected with the plant controller via control line 39'. Devices 14', 14" provide information towards the plant controller via interface 4.

Figure 2:
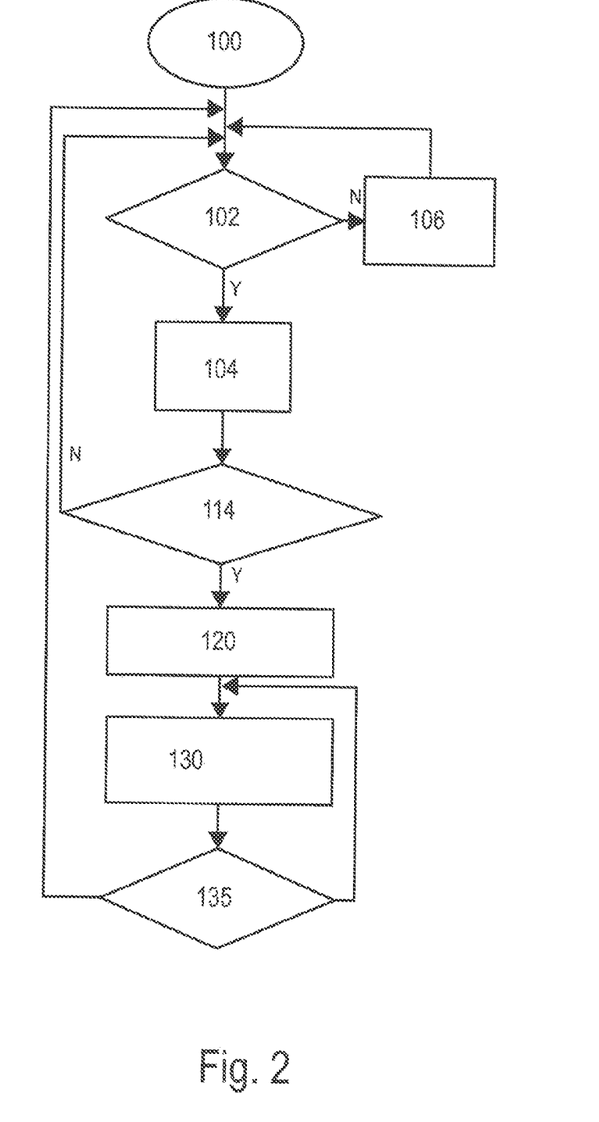
FIG. 2. is a flow chart of the controller of the plant shown in FIG. 1.

FIG. 2 discloses a preferred embodiment of controlling the plant by plant controller 3. Parts of the control of the grid parameters are performed by the power buffer controller or battery controller 21 with the, preferably grid forming, inverter 23. The method starts in step 100. In step 102, it is determined whether the amount of power in kilowatts at the generator indicates whether the engine is required to run in normal mode or below normal mode, preferably equivalent to above or below to 30% threshold of nominal capacity. In case it is determined that the engine is required to run the above the bottom threshold of normal mode, in step 106, the engine is set to operate in normal mode or to keep operating in normal mode, after which the method returns to step 102 with monitoring the engine power requirement relative to the bottom threshold of normal mode.

In case it is determined in step 102 that the power requirement from the engine is lower than the bottom threshold of normal mode, in step 104, the engine is set to run at a level of low load mode corresponding to demand. From running in a level of low load mode, the power requirement is monitored in step 114 as to whether demand is below 0 kW. In case such demand is not below 0 kW, as determined in step 114, the method proceeds in step 102. In case in step 114, it is determined that the power requirement is below 0 kW, the engine is clutched out from the alternator in step 120. Upon clutching out of the engine, control of grid parameters is transferred to the battery controller 21 cooperating with the inverter 23 to maintain the control of the grid parameters in step 130. This is described in conjunction with FIG. 3. In step 135, a monitoring is performed as to whether the generator set is running. In case the generator set is not running, control is returned to the battery controller in step 130. In case in step 135, it is determined that the generator set is running, the control proceeds in step 102 with monitoring whether the power requirement is above or below the bottom threshold of normal mode of the engine, the engine being started based on step 180, as set out below.

Figure 3:
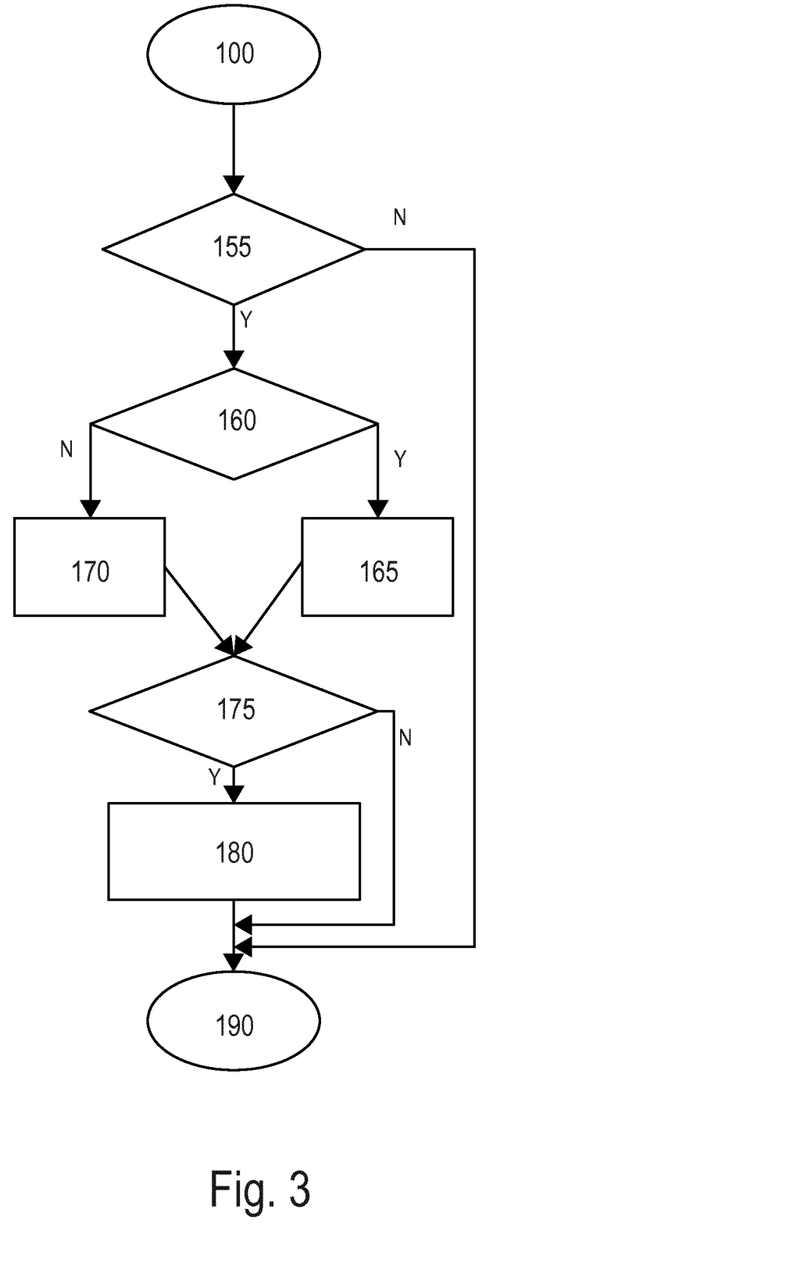
FIG. 3 is a flow chart of controlling the grid parameters by the power buffer subsystem.

FIG. 3 discloses a preferred embodiment of controlling the grid parameters by the power buffer subsystem, the controller 21 thereof in conjunction with the inverter 23. Method starts in step 100. In step 155, it is monitored whether the battery is operating outside of predetermined limits, such as safety limits. Such limits are preferably defined as a battery charge level being between an upper limit and a lower limit depending on power requirements and expected power supply from the renewable energy. Further predetermined limits as to the battery is cell temperature, preferably individual cell temperature. To the end of monitoring the status of battery cells, the batteries are preferably provided with temperature sensors at each cell or group of cells, as well as voltage and or current sensors at each cell or group of cells. In case the batteries are being charged from the renewable energy supply, and the temperatures exceed predetermined temperature limits, the dumpload system is preferably engaged or power to the batteries is limited or switched off. Another way of limiting power to the batteries is by directing more power towards the alternator to have its function as a motor in addition of the dumpload system or as a replacement thereof.

In case it is determined in step 155 that the battery does not operate outside of predetermined limits, the method proceeds in step 190 to continue in step 135. In case it is determined in step 155 that the battery is operating outside of the predetermined limits, it is determined in step 160 whether the battery operates above low operational limits. In case this determination is negative, the method proceeds in step 170 by sending an instruction to increase the output of the renewable energy system, such as the solar system or the wind system. In case the determination of step 160 is positive, an instruction is sent, in step 165, to the renewable energy system to decrease its output. In step 175, a determination is made whether the battery charge is below a predetermined minimum threshold. In case this determination is made positively, such that the battery charge is lower than the threshold, in step 180, the engine is started and or the engine is clutched in with the alternator, after which through step 190, the method proceeds in step 135.

Alternative implementations of control besides the above implementation according to FIGS. 2 and 3, comprise controls as follows. Preferably, as long as the alternator is running, preferably clutched out from the engine, the power buffer converter is set to deliver 0 reactive power. This leads to a prevention or limitation of current flow in the batteries in case of reactive power demands from the grid. Therefore, producing heat in the batteries is prevented or limited. Such reactive power demands are then delivered from the alternator. It is also provided that when the alternator is operating as a motor, and thus receiving electrical power for the rotation thereof, it is still able to control voltage on the busbar and deliver reactive power. Thus, consumers in the grid using reactive power, by for example and electrical motor in the grid, such reactive powers are met by the alternator rotating instead of by a battery in the power buffer and/or the converter thereof.

Furthermore, controls are provided to control the maximum production allowed from alternative power sources. These controls are provided, via control line 4', from the plant controller 3 towards the interface controller 4 that is in communication with controls of the renewable energy system. As such, the plant controller 3 is arranged to control the battery charge level and to control current flow charging and discharging the batteries during operation of the plant. As such a power balance is obtained by the plant controller 3 providing the overarching control. In such an embodiment, power buffer system can be arranged to compensate for fluctuations introduced to the network by consumers, or in wind and sun. As a matter of purpose, the current flow through the batteries is minimized contributing to a minimized temperature in the batteries. All of this contributes to a maximum battery life, such as at least 5-6 years instead of 1-2 years for a purely battery-operated system in which batteries are arranged to provide the full control of the grid parameters and in their full load of all disturbances, such as including reactive power demands and renewable energy fluctuations.

Furthermore, if all battery cells are fully charged or charged to the maximum threshold as predetermined for a situation, then the output of the renewable energy is reduced, preferably by means of a control signal to the respective system controller, lead to the alternator or the dumpload system until the battery is in a position to absorb energy again.

A further control setting is that the power buffer is arranged to balance the power while controlling output from the renewable energy system, and thereby minimizing a power draw from the battery and maximizing a charge towards the battery. As such it is preferred to minimize the currents to and from the batteries by controlling the grid parameters by balancing the renewable energy system with the alternator, preferably including the absorption capacity of an optional dumpload system.

In case it is expected that renewable energy will not be available within a predetermined period or power demands scenario, controls are arranged to charge the power buffer or the batteries thereof with energy from the engine. In another situation, if the power demand from the grid is so high that a combination of power from the renewable energy, power from the engine and power from the power buffer reaches its limit, the discharge of the battery may be above desirable levels to maintain the battery parameters within predetermined desired levels. In such case, the batteries will be discharged at a level up to a threshold for safety levels for such batteries. In such case, maximum discharge is limited or the batteries or even shut off. In the opposite situation, if the power from the grid towards the busbar is so high that battery charge reaches above safety levels for such batteries, the batteries are disconnected or the charge current is limited to not exceeds such levels.

Predetermined setpoints are used for controlling the renewable power system from mean values. A PID controller or a PID controller equivalent is used to a monitor fluctuations, based upon which control signals are changed to take such fluctuations into account in order to limit the strains on batteries.

An aspect of the invention relates to a method for operating a grid forming power supply plant based on a carbon based energy, such as carbon based fuel, the grid forming power supply system comprising:
- a power input connection from a carbon fuel engine based generator set, the generator set comprising:
  - the engine for converting the carbon-based energy into motion energy,
  - a generator, such as an alternator, for converting the motion energy into electrical energy,
  - and a clutch for coupling and uncoupling of the engine with the generator,
- a power buffer, such as comprising a battery, subsystem for providing short term grid forming capacity,
- a plant grid forming controller for controlling grid parameters by means of controlling steps of the method,
- the method comprising steps of:
  - controlling the grid parameters to remain within predetermined limits based on availability of power from the generator set and the battery,
  - power driving the generator such that it rotates and functions as an electromotor by providing it with electrical energy during at least part of the time the generator is uncoupled from the engine.

Further preferably, an aspect of the present invention is a non-volatile data carrier, such as a solid-state memory or a disk, comprising code means for causing that a processing unit of a plant controller performs steps according to a method according to the present invention.

While the present invention is described in the foregoing on the basis of several preferred embodiments. Different aspects of different embodiments can be combined, wherein all combinations which can be made by a skilled person on the basis of this document must be included. These preferred embodiments are not limitative for the scope of protection of this document. The rights sought are defined in the appended claims.

The invention claimed is:

1. A method for operating a grid forming power supply plant based on both a renewable energy, comprising wind energy, solar energy, hydro energy, and/or wave energy, and a carbon based energy, the grid forming power supply plant comprising:
   - a power input connection from a renewable power supply system,
   - a power input connection from a carbon fuel engine based generator set, the generator set comprising:
     - an engine for converting the carbon-based energy into motion energy,
     - a generator, comprising an alternator, for converting the motion energy into electrical energy,
     - and a clutch for coupling and uncoupling of the engine with the generator,
   - a power buffer, comprising a battery, for providing short term grid forming capacity, and
   - a plant grid forming controller for controlling at least one grid parameter by means of controlling steps of the method comprising the steps of:
     - controlling the at least one grid parameter to remain within predetermined limits based on availability of power from the renewable power supply system, the generator set and the battery,
     - uncoupling of the engine with the clutch when there is sufficient power capability by the renewable power supply system, and
     - power driving the generator such that it rotates and functions as an electromotor by providing it with electrical energy during at least part of a time the generator is uncoupled from the engine.

2. The method according to claim 1 in which the step of power driving the generator comprises a step of power driving the generator for providing motion energy to the engine during coupling of the engine with the generator.

3. The method according to claim 1 in which the step of power driving the generator comprises a step of providing electrical energy originating from the renewable power supply system to the generator.

4. The method according to claim 1, further comprising a step of the generator buffering energy, due to variations in the at least one grid parameter originating in the grid, from the grid.

5. The method according to claim 1, further comprising at least one of steps of:
   - monitoring at least one predetermined battery parameter of the power buffer comprising the battery, the at least one predetermined battery parameter comprising charge level,
   - keeping track of expected power availability from the renewable power supply system for a pre-determined period of time to come, and
   - controlling the at least one grid parameter such that the at least one predetermined battery parameter is kept between minimum and maximum values of the battery capabilities.

6. The method according to claim 1 in which controlling of the at least one grid parameter comprises a step of limiting a rate of discharge of the battery by raising or lowering of an amount of power supplied to the generator.

7. The method according to claim 1, further comprising a step of controlling the generator to absorb and/or produce reactive power, contributing to the controlling of the at least one grid parameter, while the generator is uncoupled from the engine.

8. The method according to claim 1, further comprising step of controlling the power buffer to charge on power from the renewable power supply system that is in excess of power from the renewable power supply system momentarily required for controlling the at least one grid parameter.

9. The method according to claim 1, wherein the step of controlling the at least one grid parameter comprises a step of controlling the power buffer to discharge power in order to maintain the at least one grid parameter within the predetermined limits.

10. The method according to claim 1, further comprising a step of having a power buffer control controlling the at least one grid parameter during a situation of power loss from the renewable power supply system, a time period of starting up the engine, and/or during a time period it takes to couple the engine with the generator by the clutch.

11. The method according to claim 1, further comprising a step of controlling the power buffer by preventing reactive power influences to and from the power buffer.

12. The method according to claim 1, further comprising a step of controlling the power buffer to only provide active power when controlling the at least one grid parameter in combination with the generator controlled to be handling reactive power demands from the grid.

13. The method according to claim 1, further comprising a step of monitoring a temperature level of the battery of the power buffer and controlling the use of the battery of the power buffer to remain within predetermined temperature parameters.

14. The method according to claim 1, further comprising a step of monitoring a battery current level of the battery of the power buffer and controlling the use of the battery of the power buffer to remain within predetermined battery current levels.

15. The method according to claim 1 in which the step of controlling the at least one grid parameter comprises a step of controlling the power buffer to keep a charge level in the battery in a predetermined buffer range between 40 and 60%.

16. The method according to claim 1, further comprising a step of:
increasing power from the renewable power supply system to the grid when battery parameters indicate battery operation above predetermined limits; or
decreasing power from the renewable power supply system when battery parameters indicate battery operation below predetermined limits.

17. The method according to claim 1, further comprising a step of keeping track of expected power availability from the renewable power supply system for a pre-determined period of time to come.

18. The method according to claim 1, further comprising a step of transferring control of the at least one grid parameter to a grid forming controller of the power buffer.

19. A plant for operating a grid forming power supply plant based on both a renewable energy, comprising wind energy, solar energy, hydro energy, and/or wave energy, and a carbon based energy, the grid forming power supply plant comprising:
a power input connection from au-a renewable power supply system,
a power input connection from a carbon fuel engine based generator set, the generator set comprising:
an engine for converting the carbon-based energy into motion energy,
a generator, comprising an alternator, for converting the motion energy into electrical energy,
and a clutch for coupling and uncoupling of the engine with the generator,
a power buffer, comprising a battery, for providing short term grid forming capacity, and
a plant grid forming controller for controlling grid parameters by means of the controlling steps of the method according to claim 1, the plant grid forming controller comprising:
first interaction means for interacting with a control unit of the renewable power supply system,
second interaction means for interacting with a power buffer control unit, and
third interaction means for interaction with a control unit of the generator set.

20. The plant according to claim 19, wherein:
the plant comprises a grid tied inverter when the renewable energy is solar energy; and
the plant comprises a grid forming inverter when the renewable energy is wind energy.

21. The plant according to claim 19, wherein the clutch comprises a magnetic clutch arrangement when the engine is a high-speed engine and in which the clutch comprises a standard clutch arrangement, comprising a clutch disc and a pressure plate, when the engine is a medium speed engine.

22. The plant according to claim 19, wherein the engine is a high-speed diesel engine, a medium speed diesel engine, a gas engine or a hydrogen engine.

23. The plant according to claim 19, further comprising a dumpload system that absorbs electrical energy surplus, either caused in the grid, or caused by the renewable power supply system, or caused by the carbon fuel engine based generator set.

24. The plant according to claim 19, further comprising a generator set that is arranged to operate in low load operation states in which the engine operates below 30% of nominal capacity.

25. The plant according to claim 19, further comprising a power buffer control means for implementing control of the power buffer for controlling grid forming by the power buffer.

* * * * *

UNITED STATES PATENT AND TRADEMARK OFFICE
CERTIFICATE OF CORRECTION

PATENT NO. : 11,621,560 B2
APPLICATION NO. : 16/982804
DATED : April 4, 2023
INVENTOR(S) : Søren Qvist Vestesen It is certified that error appears in the above-identified patent and that said Letters Patent is hereby corrected as shown below:

On the Title Page

Item [73], delete "A/S" and insert -- A/S (DK) --

In the Claims

Column 14, Line 45, Claim 8, before "step" insert -- a --

Column 15, Line 36, Claim 19, delete "au-a" and insert -- a --

Signed and Sealed this
Twenty-third Day of May, 2023

Katherine Kelly Vidal
*Director of the United States Patent and Trademark Office*